UNITED STATES PATENT OFFICE.

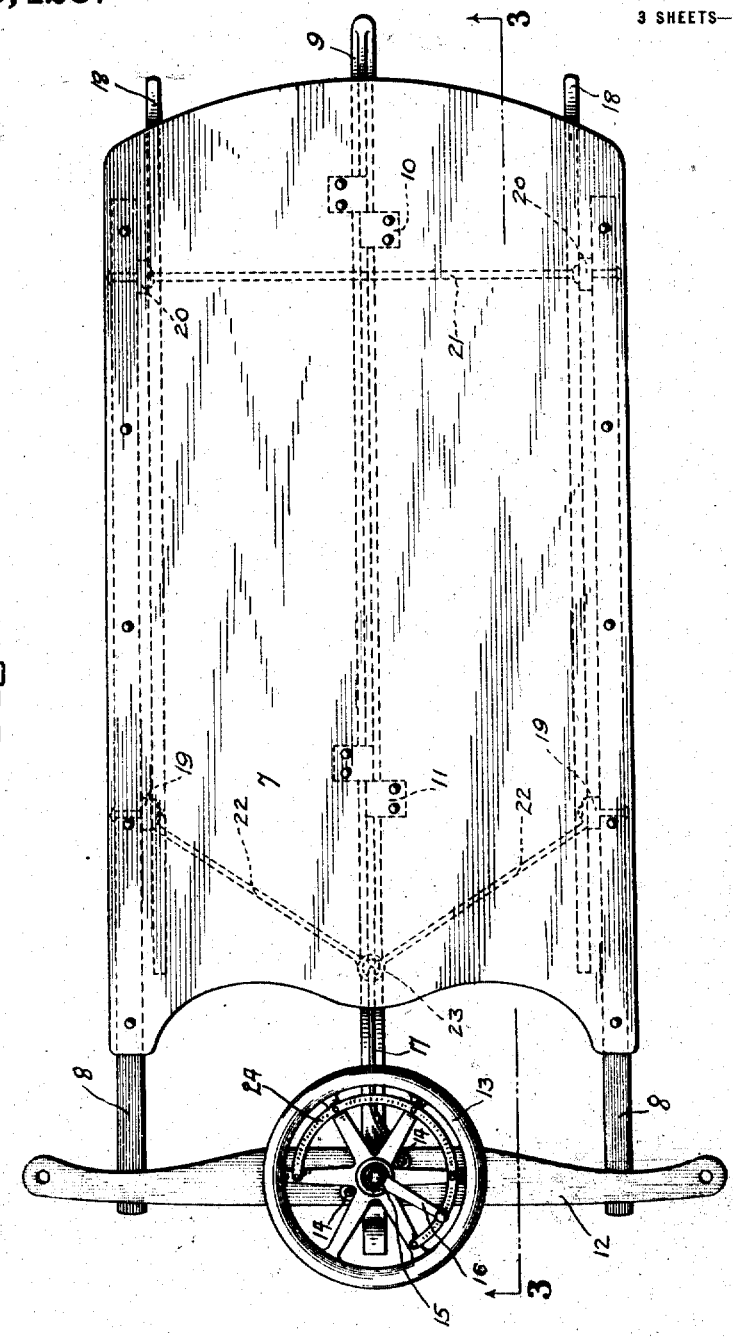

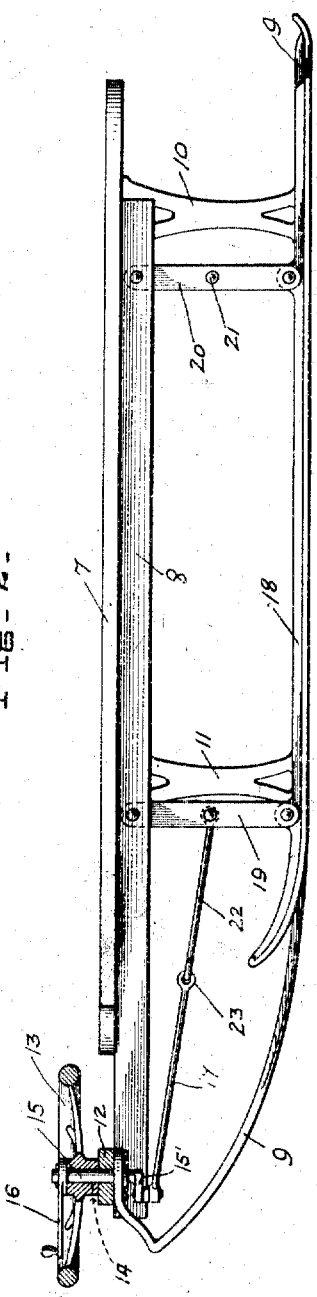
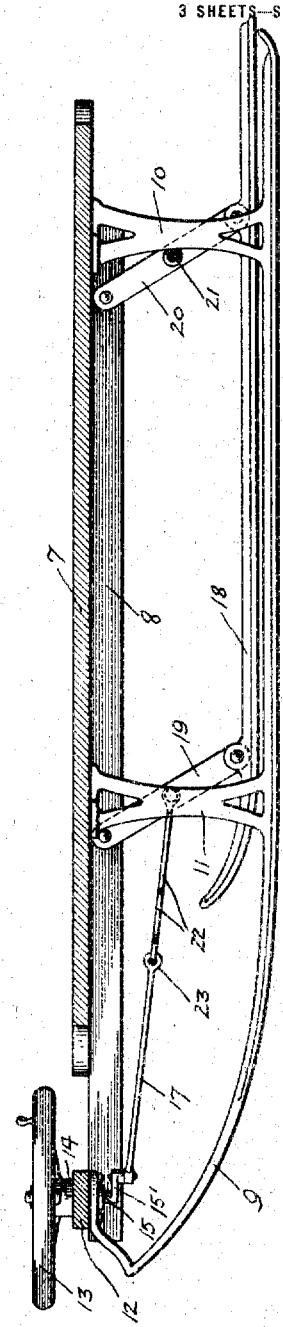

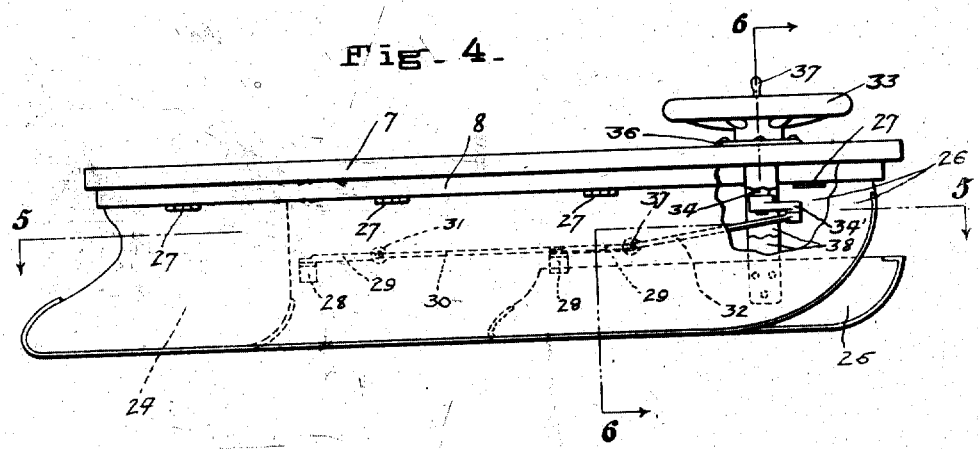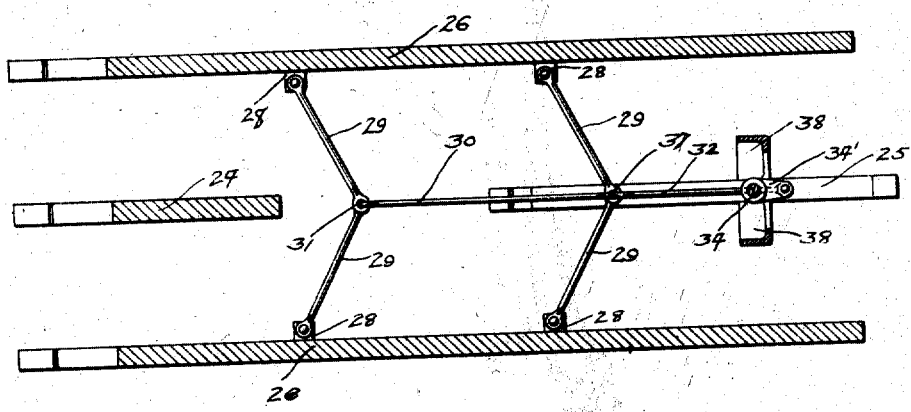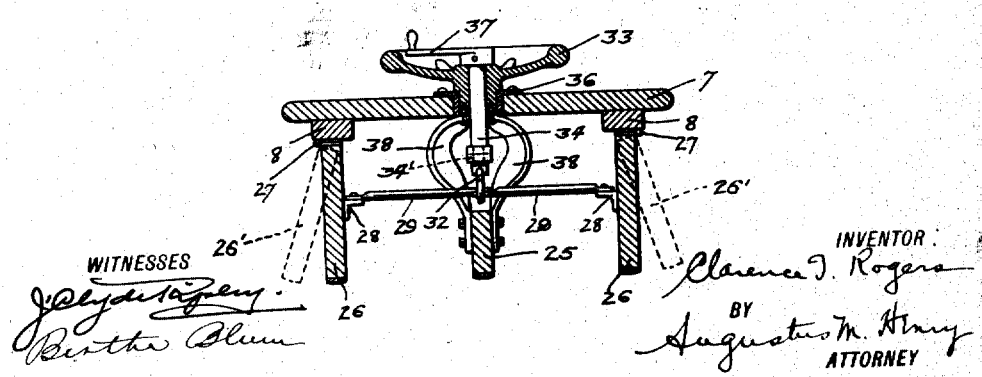

CLARENCE T. ROGERS, OF NEW YORK, N. Y.

COASTING-SLED.

1,253,425.      Specification of Letters Patent.     Patented Jan. 15, 1918.

Application filed August 28, 1914, Serial No. 859,069. Renewed June 14, 1917. Serial No. 174,753.

*To all whom it may concern:*

Be it known that I, CLARENCE T. ROGERS, a citizen of the United States of America and resident of the borough of Manhattan, in the county of New York and State of New York, have invented certain new and useful Improvements in Coasting-Sleds, of which the following is a specification.

My invention relates to improvements in sleds of the class which may be described as selectively adjustable for travel on a single runner or on a plurality of runners carried thereby, and a particular object thereof is to produce a simple sled, one which can be more easily controlled and steered, and one which will be very much faster, than such selectively adjustable sleds as heretofore used.

In most cases coasting sleds are provided with two parallel runners, and consequently are subjected to considerable friction from snow and ice. The previously known selectively adjustable types, however, have been found to afford the same advantage that a bicycle has over a four-wheeled vehicle, and, on the same principle, when the sled is in motion it is easily balanced and controlled, may be prevented from tipping when going slowly or being drawn uphill.

The main object of my invention, in other words, is to produce a sled having the features just described, and one characterized by marked advantages as to simplicity of construction and of assembly, by inexpensiveness of manufacture, by a strong and sturdy yet light build throughout, by a capacity for great speed in coasting and by a convenient and very attractive arrangement for steering control and management.

Referring now to the accompanying drawings, which are to be taken as a part of this specification, and wherein there are disclosed two of the various possible embodiments of this invention as at present preferred:

Figure 1 is a top plan view of one of said embodiments;

Fig. 2 is a side-elevation of said embodiment, the steering wheel 13 and its associated parts being partly shown in section to aid the disclosure;

Fig. 3 is a vertical sectional view taken on the line 3—3 of Fig. 2, illustrating, differentially from the disclosure of Fig. 2, a disposition of the parts whereby the plurality of side runners 18 are maintained in elevated positions;

Fig. 4 is a side elevation of another embodiment, this view showing certain of the runners as being partially broken away;

Fig. 5 is a longitudinal vertical sectional view taken on the line 5—5 of Fig. 4; and Fig. 6 is a transverse vertical sectional view, taken on the line 6—6 of Fig. 4.

Similar reference characters refer to similar parts throughout the several views of the drawings.

Adverting first to a description of the embodiment disclosed in Figs. 1, 2 and 3, the sled may be of any usual form, though I prefer to maintain generally the style of low, flat construction. It has a top 7, and side-frames 8.

The sled has a single center runner 9, rigidly secured to the top 7 as by means of its integrally carried and upstanding extensions 10 and 11. This runner 9 is preferably flexible in advance of its extension 11, and its forward terminus is fixedly connected to the underside of a cross-bar 12.

Above the center of cross-bar 12 is a steering wheel 13 fixedly attached to said cross-bar as by means of the ears 14 which are disclosed in Fig. 1 and which are integrally formed upon the hub of the wheel. It will be seen that upon endeavoring to rotate the steering wheel to the right or left of its fixed center, the cross-bar 12 will be swung obliquely in one direction or the other and thereby to the right or left flexing the runner 9.

The hub of steering wheel 13 is longitudinally vertically bored, and cross-bar 12 is transversely apertured in downward prolongation of said bore, all as shown in Fig. 2. Extending through said cross-bar and aperture is a spindle 15, upon the upper end of which is keyed a crank 16. The lower end of the spindle integrally carries an offset arm 15', to which is pivotally attached a link 17.

In lieu of the rigidly mounted side runners generally provided, I show a plurality of movable side runners 18, each hung from its associated side frame 8 by a plurality of dependent links 19 and 20. Links 20 are connected by means of the cross-rod 21, and each of the links 19 has pivotally connected thereto as shown one terminus of a link 22. Link 22 and link 17 are interpivoted at the point 23.

A calibrated scale 24 may be mounted upon steering wheel 13 as shown in Fig. 1, if desired.

The operation of this embodiment of this invention, which from the foregoing description should be largely obvious, is substantially as follows: After the sled has started its coasting travel, and the passenger deems it is under sufficient speed, he turns the operating crank 16 sufficiently to redispose the parts as shown in Fig. 2, so that they will assume the locations illustrated in Fig. 3. Without material effort, he has thus sufficiently elevated the side runners 18 so that the only ground-contacting surface is now the lower edge of the center runner 9. The result is less friction and greater speed, all without any danger of overtipping on account of the readiness of the side runners 18, although elevated as aforesaid, to act as safeguards should a spill threaten. Moreover, flexings of the forward end of runner 9, due to manipulations of steering wheel 13 as aforesaid, are rendered more effective for balancing purposes while said side runners are elevated.

What may be considered a minor detail of construction, but which is nevertheless of great practical value (and which is disclosed in connection with the embodiment just described but which is not so disclosed in connection with the embodiment illustrated in Figs. 4, 5 and 6), is the design of the parts whereby when the side runners 18 are once elevated (see Fig. 3) the pivotal connection between arm 15 and link 17 is at a dead-center with the axis of spindle 15, and whereby when the side runners 18 are depressed (see Fig. 2) the pivotal connection between the arm and link just mentioned is also at a dead-center with the axis of said spindle.

Examining now the construction of the embodiment disclosed in Figs. 4, 5 and 6, the sled shown here is provided, too, with the usual top 7 and side-frames 8. This embodiment may be said to disclose an application of my invention to that type of sled known technically as a "pig-sticker."

This sled has two center runners 24 and 25, preferably normally longitudinally alined. The rear center runner 24 is fixedly attached to the underside of top 7. The pivotal mounting of the front center runner 25 will be described in a moment.

The parallel side runners 26 are each swiveled and depending from the two side-frames 8, as by means of hinges 27. These hinges as here designed permit the side-runners 26 to spread from beneath the top 7 as indicated at 26' in Fig. 6; but it is obvious that said runners may otherwise be hung or supported. Four brackets 28 are mounted upon the inner sides of the two side-runners and to each of these brackets is pivotally connected one terminus of a link 29. The free ends of the rear pair of links 29 are interpivoted with one end of a link 30 as at the point 31 (see Figs. 4 and 5); and the other end of link 31 is interpivoted with one end of each of the forward pair of links 29 and one end of the link 32 as at the point 37 (see Figs. 4, 5 and 6).

The forward end of link 32 is pivotally connected with the free terminus of an offset arm 34' mounted upon a spindle 34, which is journaled longitudinally of the hub of a rotatable steering wheel 33, as shown in Fig. 6. Said hub is itself rotatively journaled within a bushing 36 inserted into an aperture formed transversely and vertically of top 7. The upper terminus of spindle 34 has fixedly mounted thereon an operating-crank 37.

A description of the mountings of front center-runner 25 has been thus far deferred; for it was deemed advantageous preliminarily to describe the mounting of spindle 34 inasmuch as said mounting of said spindle must be preferably such as not to interfere with the necessary free play of offset arm 34' and its attached link 32. As shown, the lower edge of front center-runner 25 is maintained preferably at a common level with the lower edge of rear center-runner 24 by means of the struts 38, fixedly attached to the lower portion of the hub of steering wheel 33. Consequently, while these struts prevent an upward longitudinal displacement of said hub, they permit said front center-runner to be manipulated for balancing purposes by means of the steering wheel 33.

The operation of this embodiment of this invention, which should from the foregoing description largely be obvious, is substantially as follows: After the sled has started its coasting, and the passenger deems it is at sufficient speed, he turns the operating crank 37 sufficiently to redispose the side runners 26 to their locations 26' as shown in Fig. 6; and here, too, without material effort, he has thus sufficiently elevated the lower edge of the side runners 26 so that the only ground-contacting surfaces are now the lower edges of center runners 24 and 25. The result is, again, less friction and greater speed; also without any danger of overtipping on account of the readiness of the side runners 26, although redisposed as aforesaid, to act as safeguards should a spill threaten. Moreover, swivelings of the front center-runner 25, due to manipulations of steering wheel 33, are rendered more effective for balancing purposes while said side runners are elevated.

From the foregoing it will be seen that I have produced a sled which is of low, flat construction, and one in which the operator can, at will, and without any necessity for lifting his own weight or the weight of the sled-body, change from a sled running upon three or more runners to one running upon a single runner or upon a plurality of longitudinally alined runners. It is apparent that it will require a little skill to maintain a balance to operate the sled successfully, just as it requires a certain amount of skill to ride a bicycle, but when the sled is under way it easily balances and runs so smoothly and with so little friction that great speed is attained.

Inasmuch as many changes could be made in the above construction, and many apparently widely different embodiments of my invention could be made without departing from the scope thereof, it is intended that all matter contained in the apove description or shown in the accompanying drawings shall be interpreted as illustrative and not in a limiting sense.

It is also to be understood that the language used in the following claims is intended to cover all the generic and specific features of the invention herein described and all statements of the scope of the invention, which as a matter of language, might be said to fall therebetween.

I claim:

1. A coasting sled, including a frame, a center runner the rear portion of which is rigidly mounted upon the frame and the front portion of which runner is flexible, means adapted to flex said front portion of said runner, a plurality of side runners the flat of each of which is always maintained in the same plane, and means adapted for actuation to elevate the ground-contacting edges of said side runners.

2. A coasting sled, including a frame, a center runner the rear subdivision of which is rigidly mounted upon the frame and the front subdivision of which is movable relatively of the frame, means adapted thus to move said front subdivision, a plurality of side runners, and means adapted for actuation to elevate the ground-contacting edges of said side runners, the means first-mentioned including a steering wheel carried by the frame and the means last-mentioned including a spindle journaled within the hub of the steering wheel and rotatable relatively of said hub.

3. A coasting sled, including a frame, a center runner the rear portion of which is rigidly mounted upon the frame and the front portion of which is flexible, means adapted to flex said front portion of said runner, a plurality of side runners, and means adapted for actuation to elevate the ground-contacting edges of said side runners, the means last-mentioned including a steering wheel fixedly attached to the said front portion of said center runner.

In witness whereof I have hereunto signed my name in the presence of two witnesses.

CLARENCE T. ROGERS.

In the presence of—
AUGUSTUS M. HENRY,
BERTHE BLUM.